United States Patent [19]

Leith

[11] 3,998,610

[45] Dec. 21, 1976

[54] ROTATING CONCENTRIC HOMOGENEOUS TURBULENCE CENTRIFUGE

[75] Inventor: William Cumming Leith, Trail, Canada

[73] Assignee: Cominco Ltd., Vancouver, Canada

[22] Filed: Dec. 12, 1974

[21] Appl. No.: 532,080

Related U.S. Application Data

[63] Continuation-in-part of Ser. No. 198,911, Nov. 15, 1971, abandoned.

[52] U.S. Cl. ............................ 55/17; 55/400; 233/DIG. 1; 233/1 A; 233/27; 233/11
[51] Int. Cl.² ........................... B01C 45/12
[58] Field of Search .............. 233/2, 3, DIG. 1, 7, 233/11, 23 R, 27, 31, 37, 43, 1 A, 15; 55/17, 400

[56] References Cited

UNITED STATES PATENTS

| | | | |
|---|---|---|---|
| 499,348 | 6/1893 | Peck | 233/7 |
| 1,952,788 | 3/1934 | Berlin | 233/2 |
| 2,281,616 | 5/1942 | Placek | 233/1 A |
| 2,876,949 | 3/1959 | Skarstrom | 233/11 |
| 2,947,472 | 8/1960 | Skarstrom et al. | 233/DIG. 1 |
| 3,108,955 | 10/1963 | Boyland | 233/27 |
| 3,202,347 | 8/1965 | Thurman | 233/15 |
| 3,501,091 | 3/1970 | Oyama et al. | 233/DIG. 1 |

*Primary Examiner*—George H. Krizmanich
*Attorney, Agent, or Firm*—Arne I. Fors

[57] ABSTRACT

A gas centrifuge and method for the separation of isotopic gaseous mixtures, particularly for the enrichment of uranium by the evaporative, concurrent-flow and countercurrent-flow principles using Taylor circular Couette motion. Gaseous isotopes either alone or mixed with a carrier gas, more particularly uranium isotopes in mixture with uranium hexafluoride carrier gas, are fed to a rotor assembly of a gas centrifuge which comprises two concentric cylinders which may be rotated at the same or at different angular velocities and in the same or opposite directions to create centrifugal forces sufficient to diffuse the heavier fraction of the gas mixture to the periphery of the assembly and the lighter fraction towards the axial portion of the assembly. The rotor comprises an inner, perforate, rotatable cylinder and an outer, continuous, smooth-walled, rotatable cylinder concentric with the inner cylinder and defining an annulus therebetween.

14 Claims, 5 Drawing Figures

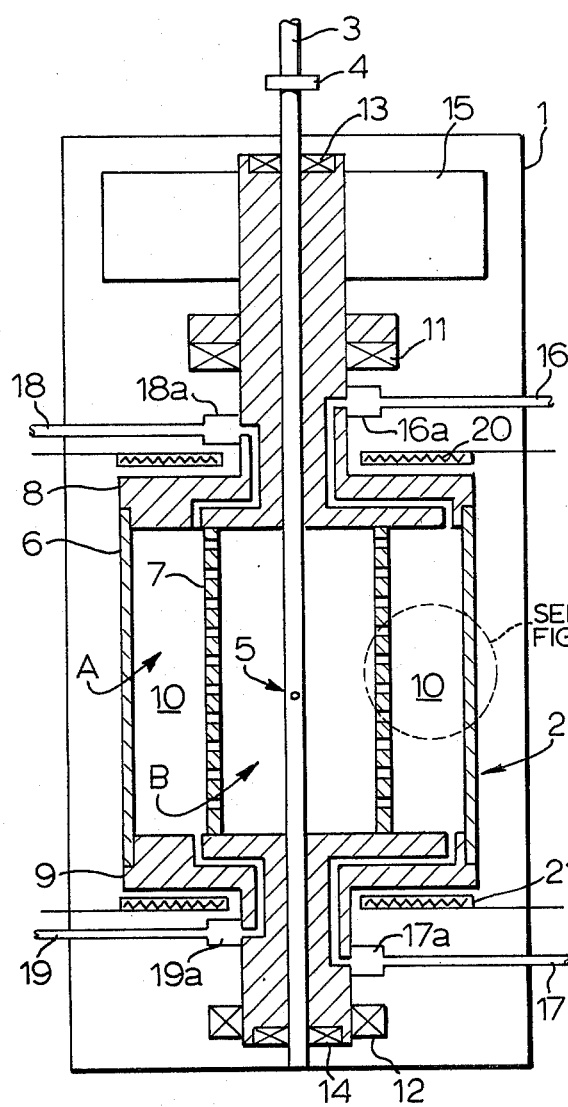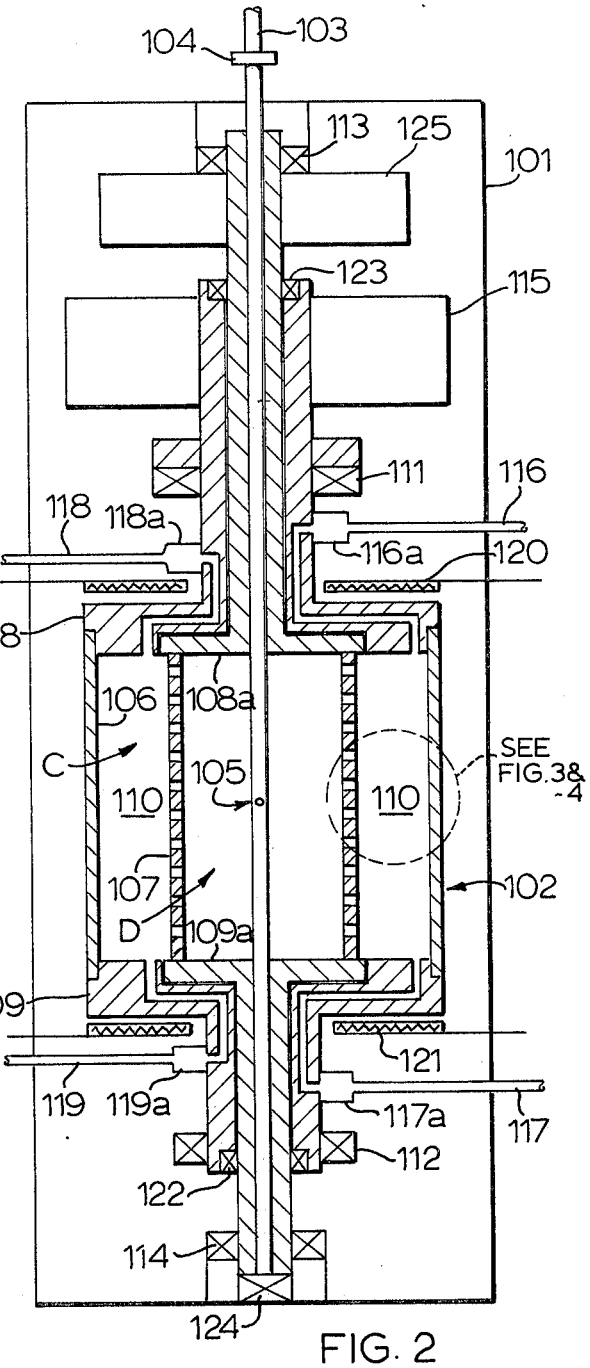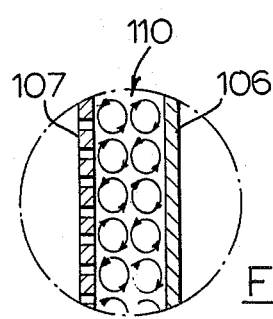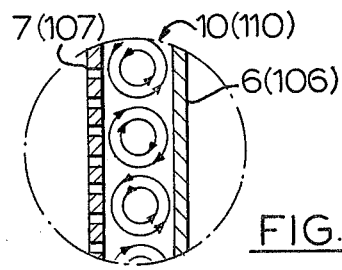

ROTATING CONCENTRIC HOMOGENEOUS TURBULENCE CENTRIFUGE

This application is a continuation-in-part of application Ser. No. 198,911 filed Nov. 15, 1971.

BACKGROUND OF THE INVENTION

This invention relates to a gas centrifuge and to a method for the separation of isotopic gaseous mixtures and particularly for the enrichment of uranium in uraniumhexafluoride.

A method of separating isotopes in gaseous mixtures is the application of centrifugal forces to a mixture in a gas centrifuge whereby a lighter fraction of the mixture diffuses to the axial portion of the centrifuge and a heavier fraction diffuses to the peripheral portion. The fractions may be separately removed from the centrifuge.

The gas centrifuges may be distinguished in three types based on evaporative, concurrent flow and countercurrent flow principles, respectively. In an evaporative type centrifuge, a gas mixture is introduced axially into the centrifuge through a hollow shaft. In the concurrent flow type, a gas mixture enters in two streams at one end of the rotor of the centrifuge and flows longitudinally to the other end where the heavier fraction is removed near the periphery and the lighter fraction is separately removed near the axis of the rotor. The longitudinal flow is used to establish an axial as well as a radial concentration gradient. In the countercurrent flow type, gas mixture is fed near the axis of the rotor and near the periphery of the rotor at opposite ends. The heavier fraction is removed near the periphery of the rotor and the lighter fraction near the rotor axis at opposite ends of the rotor and at points opposing the inlet points of the gas mixture. The countercurrent flow type centrifuge is the most efficient of the three types in obtaining maximum separation of the fractions.

Thus, the prior art generally describes gas centrifuges that are based on the above described three types and which usually comprise a fixed outer housing and a single, cylindrical rotor into which the gas enters and leaves the centrifuge endwise thereof.

For example, in U.S. Pat. No. 3,108,955 an evaporative type gas centrifuge is disclosed wherein fluid may be introduced in one of the ends of a partitioned rotor. The fluid enters into spaces between the partitions of the rotor through apertures arranged along an axial section of the rotor and separates in a lighter fraction near the rotor axis which may be withdrawn from the centrifuge. In U.S. Pat. No. 3,613,989 a gas centrifuge is disclosed which comprises an elongated rotor rotating at high velocity within an outer cylinder, holes in each end of the rotor for the jetting of enriched gas and depleted gas respectively, means to heat the upper rotor region and to cool the lower rotor region, a circumferential chamber between rotor and housing and means to supply a gas mixture into the rotor and to withdraw gas mixture from the central region of the rotor. The gas in the rotor is subjected to pressure diffusion through high velocity rotation and to countercurrent flow by means of the heating and cooling devices.

The present invention improves the separation efficiency of the three types of gas centrifuges by the application of Taylor circular Couette motion. This motion is based on fluid flow between rotating concentric cylinders as formulated by M. M. Couette in Annals Chim. Phys., Ser. VI, Vol, 21, 1890, p. 433, and depends on the criteria for hyrodynamic stability as reported by G. I. Taylor in Phil. Trans. Roy. Soc. London, Ser. A, Vol. 223, 1923, p. 289, as well as on conditions to establish cellular vortices in radial direction in the fluid as described by C. C. Lin in Theory of Hydrodynamic Instability, Univ. Press Cambr. 1955, and D. Coles, J. Fluid Mech., Vol. 21, part 3, 1965, p. 385–425.

SUMMARY OF THE INVENTION

The object of the present invention is to provide a method and apparatus for the separation of isotopes in gaseous mixtures and particularly for the enrichment of uranium by the evaporative, concurrent-flow and countercurrent-flow type gas centrifuges using Taylor circular Couette motion.

According to the present invention, gaseous isotopes either alone or mixed with a carrier gas, and more particularly uranium isotopes in mixture with uranium hexafluoride carrier gas, are fed to a rotor assembly of a gas centrifuge which comprises two concentric cylinders which may be rotated at the same or at different angular velocities and in the same direction or in opposite directions. The rotor assembly is rotated at high velocity to create the centrifugal forces necessary to diffuse the heavier fraction of the gas mixture to the periphery of the assembly and the lighter fraction to the axial or central portion of the rotor assembly. In addition, the gas mixture in the rotor assembly of the apparatus of the invention is subject to Taylor circular Couette motion.

Taylor circular Couette motion occurs in the gas mixture in the annulus defined between the concentric rotating cylinders and is caused by friction between gas and cylinder walls, the rotational directions and angular velocities of the cylinders, as well as the design of the rotor assembly. The motion establishes a single helical row of stationary cellular vortices or a double helical row of cellular vortices in the gas mixture in the annulus between the concentric cylinders which results in an increase in the residence time of the gas and a consequent higher concentration gradient across the annulus. The efficiency of the separation is thereby improved.

An enriched gas fraction and a depleted gas fraction, more particularly a uranium isotope enriched gas fraction and a uranium isotope depleted gas fraction, are removed from the rotor assembly in accordance with the type of centrifuge.

BRIEF DESCRIPTION OF THE DRAWINGS

Other objects of the invention and the manner in which they can be attained will become apparent from the following detailed description of the drawings, in which:

FIG. 1 is a sectional elevation of an embodiment of the gas centrifuge according to the invention;

FIG. 2 is a sectional elevation of another embodiment of the gas centrifuge according to the invention;

FIG. 3 is a partial elevation of the annuli between the rotating cylinders of FIGS. 1 and 2 which illustrates a single helical row of cellular vortices in the gas mixture;

FIG. 4 is a partial elevation of the annulus between the rotating cylinders of FIG. 1 which illustrates a double helical row of cellular vortices in the gas mixture.

DESCRIPTION OF THE PREFERRED EMBODIMENTS

Figure 5:
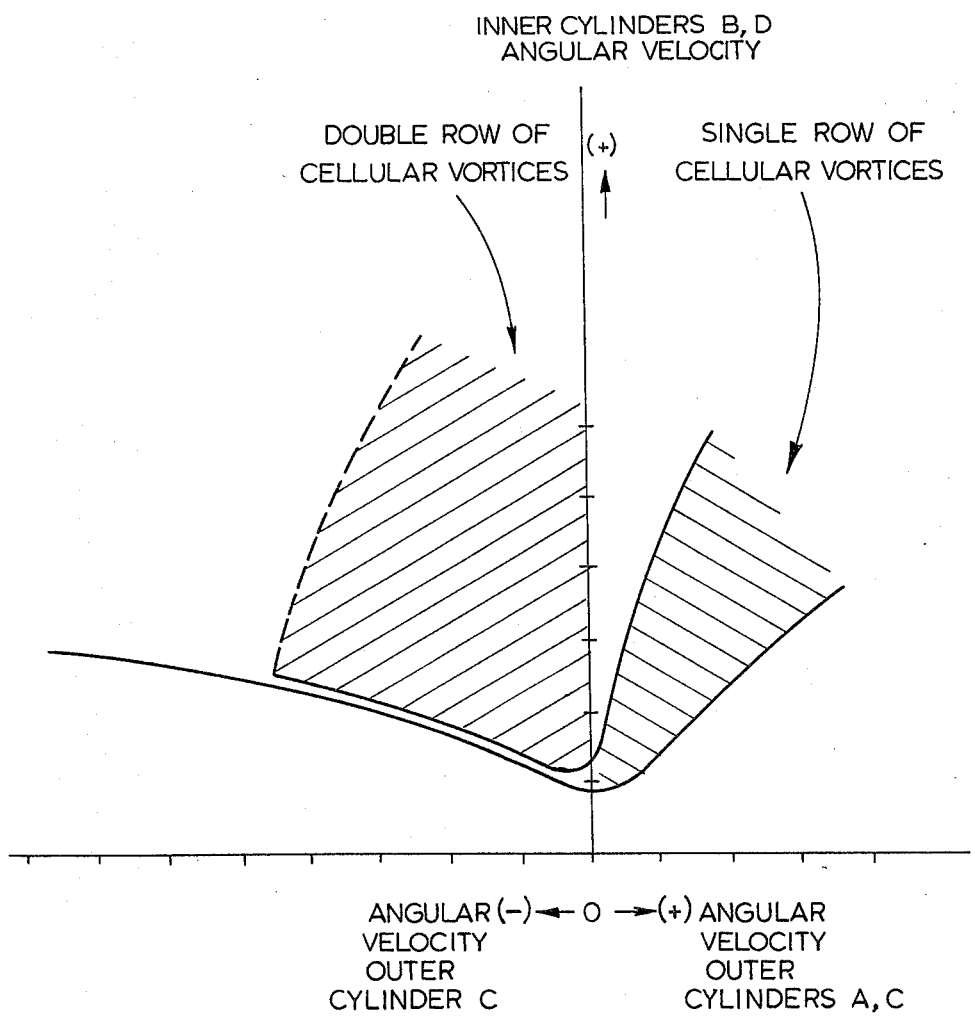
FIG. 5 graphically illustrates specific regimes of Taylor circular Couette motion.

In the drawings, like reference numerals designate like parts.

With reference to FIG. 1, the gas centrifuge comprises an enclosure 1 which provides a vacuum-tight jacket for the rotor assembly, generally indicated at 2, and its supports and drive mechanisms. The enclosure 1 is normally filled with a lightweight gas such as hydrogen or helium at a pressure of about 10 mm mercury. Rotor assembly 2 is arranged coaxially around a hollow, non-rotating, central shaft 3. Shaft 3 passes through the top of enclosure 1, is closed at its lower end and may be closed at its upper end by closing means 4, such as a valve. Shaft 3 contains one or more small holes located in one plane of a cross-section of the shaft, central in rotor assembly 2 as indicated at 5. Rotor assembly 2 comprises an outer, continuous, i.e. imperforate, cylindrical wall 6 and an inner, perforated cylindrical wall 7. Cylindrical walls 6 and 7 are coaxially mounted on central shaft 3 and are closed with end caps 8 and 9 at their upper and lower extremities, respectively. Cylindrical walls 6 and 7, together with end caps 8 and 9, form an outer cylinder A and an inner cylinder B respectively, and enclose an annulus indicated by numeral 10 defined therebetween.

Rotor assembly 2 is supported by bearings 11 and 12 which have dry, nitrogen gas seals. Rotating seals 13 and 14 keep the gas mixture out of enclosure 1. A motor 15 drives the rotor assembly 2.

Four channels, numbered 16, 17, 18 and 19, pass through enclosure 1 and through the end caps. The channels are each provided with rotating seals, numbered 16a, 17a, 18a and 19a, at the point at which they pass into the end caps. The four channels are used for the feeding of gas mixture to and for the discharging of gas mixture from the annulus 10 of the rotor assembly. The direction of the flow through the channels depends on whether the centrifuge is of the evaporative, the concurrent flow or the countercurrent flow type. Channels 16 and 17 pass through end caps 8 and 9 respectively and may conduct gas mixture to or from the outer peripheral area of annulus 10. Channels 18 and 19 pass through end caps 8 and 9 respectively and may conduct gas mixture to or from the inner portion of annulus 10.

Heating means 20 and 21 are positioned in enclosure 1 in approximation to end caps 8 and 9 respectively.

With reference to FIG. 2, the gas centrifuge is similar to the one shown in FIG. 1 but the annulus 110 is formed by two cylindrical walls with separate end caps which form, in combination, two closed coaxial cylinders C and D which are individually rotated in the same direction or in opposite directions at variable velocities.

The gas centrifuge according to FIG. 2 comprises an enclosure 101, a rotor assembly generally indicated at 102 and its supports and drive mechanisms. Assembly 102 is arranged coaxially around a hollow, non-rotating, central shaft 103. Shaft 103 is closed at its lower end and closing means 104, such as a valve, is provided at its upper end outside enclosure 101. Shaft 103 contains one or more small holes located in one plane of a cross-section of the shaft as indicated by numeral 105. Rotor assembly 102 comprises an outer, continuous cylindrical wall 106 and an inner, perforated cylindrical wall 107. Walls 106 and 107 are coaxially mounted on central shaft 103. Wall 106 is closed with end caps 108 and 109 forming outer cylinder C and wall 107 with end caps 108a and 109 a forming inner cylinder D. An annulus, indicated at 110, is formed between cylinders C and D.

The structure forming outer cylinder C is supported by bearings 111 and 112 having dry, nitrogen-gas seals. The structure forming inner cylinder D is supported by bearing 124 and is provided with sealed bearings 122 and 123 fitted on end caps 108a and 109a respectively and inside the extremities of end caps 108 and 109 of cylinder C. Rotating seals 113 and 114 on the extremities of end caps 108a and 109a of cylinder D keep the gas mixture out of enclosure 101. A motor 115 drives outer cylinder C, while a motor 125 drives inner cylinder D.

Four channels, numbered 116, 117, 118 and 119, pass through enclosure 101 and through the end caps of outer cylinder C. The channels are provided with rotating seals 116a, 117a, 118a, and 119a respectively, at the point where they pass into the end caps of cylinder C. The channels are used for transferring gas mixture to or from the annulus 110. Channels 116 and 117 pass through end caps 108 and 109 respectively and may conduct gas mixture to or from the periphery of annulus 110, while channels 118 and 119 pass through end caps 108 and 109 respectively and may conduct gas mixture to or from the inner portion of annulus 110.

Heating means 120 and 121 are positioned in enclosure 101 in approximation to end caps 108 and 109 respectively.

The gas centrifuge according to the invention thus is described and illustrated having a single inner, perforated cylinder wall which provides one annulus between wall 107 and wall 106. It will be understood that the gas centrifuge could be used which has several perforated coaxial cylinders providing several annuli between adjacent cylinder walls to separate gas mixtures in more than two fractions or to separate a range of heavier, medium and lighter isotopes simultaneously within one rotor assembly of the centrifuge of the evaporative, concurrent and countercurrent types.

In the operation of the embodiments of the gas centrifuges according to FIG. 1 and FIG. 2 as an evaporative type centrifuge, a gas mixture which contains at least two components of a different molecular weight, such as for example one or more gaseous isotopes in a carrier gas, more specifically uranium isotopes 235 and 238 either separately or together in uranium hexafluoride carrier gas, is fed into the hollow, non-rotating, central shafts 3, 103 through opened closing means 4, 104 and openings 5, 105 into the axial portions of rotor assemblies 2, 102 where the gas mixture is subjected to centrifugal forces caused by rotating rotor assemblies 2, 102. The gas mixture passes through the perforations in cylinder walls 7, 107 into annuli 10, 110. In each annulus, the gas mixture is not only subjected to the centrifugal forces but also to Taylor circular Couette motion, to be described below.

The centrifugal forces cause a separation of the gas mixture into a heavier fraction which migrates to form a thin, cylindrically-shaped, coaxial stream in the peripheral area of annuli 10, 110 and a lighter fraction which migrates to form a thin, cylindrically-shaped, coaxial stream in the inner areas of annuli 10, 110. The Taylor circular Couette motion in each annulus will cause an increase in the residence time of the gas mixture in the annulus which results in the establishment of a higher radial concentration gradient across the annulus, which, in turn, results in an improved efficiency of the separation (enrichment) process in the gas centrifuge.

The stream comprising the heavier fraction is removed from the respective annuli through channels 16, 116 and 17, 117 and the stream comprising the lighter fraction is removed through channels 18, 118 and 19, 119.

In the operation of the gas centrifuges according to FIG. 1 and FIG. 2 as a concurrent type centrifuge, the gas mixture is fed directly into the annuli 10, 110 between cylinders A, C and B, D through channels 17, 117 and 19, 119. Closing means 4, 104 on shafts 3, 103 are closed. The gas mixture in each annulus is again subjected to centrifugal forces as well as Taylor circular Couette motion with the results as described above. The stream comprising the heavier fraction, in the peripheral area of each annulus, is concurrent with the stream comprising the lighter fraction in the inner area of the annulus. The heavier fraction is removed through channels 16, 116 and the lighter fraction through channels 18, 118.

In the operation of the gas centrifuges according to FIG. 1 and FIG. 2 as countercurrent type centrifuges, the gas mixture is fed directly into the annuli 10, 110. One portion of the gas mixture may be fed through channels 16, 116 and the remaining portion through channel 19, 119; the portions may be equal or unequal as required. Closing means 4, 104 on shafts 3, 103 are closed. The gas mixture in each annulus is again subjected to centrifugal forces as well as Taylor circular Couette motion with the results as described above. The stream comprising the heavier fraction in the peripheral area of each annulus is countercurrent with the stream comprising the lighter fraction in the inner area of each annulus. The heavier fraction is removed through channels 17, 117 and the lighter fraction through channels 18, 118.

If desired, in the operation of a concurrent flow type centrifuge, all or a portion of the lighter fraction discharged from channels 18, 118 may be recirculated to feed inlet channels 19, 119 and all or a portion of the heavier fraction discharged from channels 16, 116 may be recirculated to feed inlet channel 19, 119. In the operation of a countercurrent flow type centrifuge, all or a portion of the lighter fraction may be recycled from channels 18, 118 to channels 19, 119 and all or a portion of the heavier fraction from channels 17, 117 to channels 19, 119. Alternatively, in case of a multiple centrifuge arrangement, such as in the cascade arrangement, the fraction may be fed to a subsequent or previous centrifuge, as required, and treated according to the concurrent or countercurrent flow principle.

The gas centrifuge of the countercurrent type is the most efficient of the three types as it enables higher concentration gradients for the same feed composition than the other types.

Heating means 20, 120 and 21, 121 are used to maintain a substantially constant longitudinal temperature in the centrifuges, i.e. only a slight, precisely controlled, temperature gradient may be necessary between the end caps of the rotor assemblies.

The perforations in cylindrical walls 7, 107 of the inner cylinders B, D, respectively, serve not only as a passage for the gas mixture in the case of the evaporative type centrifuge, but also serve, in all three types, to increase the velocity of the gas mixture close to walls 7, 107 and create the conditions necessary for establishing Taylor circular Couette motion. The number and diameter of the perforations in, the perforation pattern of and perforated area as a percentage of the surface area of inner cylinders B, D depend on the desired gas flow through the gas centrifuges and can be optimized for a specific separation.

Couette motion generally refers to motion imparted to a fluid contained in an annulus between two rotating concentric cylinders which move relative to one another with uniform angular velocities. Couette motion, or shear flow, occurs when the cylinders rotate quite slowly within the ranges of laminar flow.

With reference to FIGS. 3, 4 and 5, Taylor circular Couette motion occurs at higher velocities of the rotating cylinders and is caused by the difference in velocities of the gas mixture in the annulus between cylinders A and B and cylinders C and D. The higher friction in the gas mixture caused by the perforations in cylindrical walls 7, 107 results in an acceleration of the gas mixture in the inner portion of each annulus. The thin coaxial cylindrical stream of gas mixture at walls 7, 107 will, therefore, attain a higher angular velocity than the thin coaxial cylindrical streams of gas mixture at the smooth surface of cylindrical walls 6, 106. The difference in angular velocities creates a multiple array of cellularly shaped, stationary vortices in the gas mixture in each annulus.

The difference in angular velocities in the gas mixture occurs in the apparati according to FIG. 1 and FIG. 2 when the cylinders A and B and cylinders C and D are rotated at the same angular velocities (inherent in the apparatus according to FIG. 1, wherein cylinders A and B are not separately rotatable). In this case, a single helical row of stationary, cellular vortices will occur. This flow regime is indicated in FIG. 5 and is illustrated schematically in FIG. 3.

The difference in angular velocities in the gas mixture in the apparatus according to FIG. 2 may be increased further, and thus the separations enhanced, by rotating cylinders C and D at different angular velocities. Preferably, the angular velocity of the outer cylinder C is reduced. The angular velocity of cylinder C should not be reduced to less than about 30% of the angular velocity of inner cylinder D. When outer cylinder C is rotated at an angular velocity of from about 30 to 100% of the angular velocity of inner cylinder D, the single helical row of stationary cellular vortices will be maintained.

The difference in angular velocities in the gas mixture in the apparatus according to FIG. 2 may also be increased by rotating cylinders C and D at different angular velocities but in opposite directions. When the angular velocity of outer cylinder C is reduced to about 30% of that of inner cylinder D and the cylinders are rotated in opposite directions, a double helical row of stationary cellular vortices will be formed. This flow regime is indicated in FIG. 5 and is illustrated schematically in FIG. 4.

In the gas centrifuges of the three types described above and as embodied in the above descriptions with reference to the drawings, the radius of the inner cylinders B, D may be in the range of from about 0.70 to 0.95 of the radius of the outer cylinders A, C, respectively. The angular velocity of the inner cylinders B, D may be in the range of from about 1.0 to 3.3 times the angular velocity of the outer cylinders A, C, respectively. The peripheral velocities of cylinders A and B and cylinders C and D can attain values in the range of from about 80 μ/sec (meters per second) to about 600 μ/sec, the upper limit being determined by the strength of present-day materials of construction. When the cylinders comprising each pair are rotated at the same angular velocities and in the same direction the preferred range of peripheral velocities is from about 400 μ/sec to about 600 μ/sec. When the cylinders comprising each pair are rotated in the same or in opposite directions but at different angular velocities, inner cylinders B, D can attain a peripheral velocity in the range of from about 400 to about 600 μ/sec and outer cylinders A, C can attain a peripheral velocity in the range of from about 80 to about 570 μ/sec.

What I claim as new and desire to protect by Letters Patent of the United States is:

1. A method for separating and enriching mixtures of gases based on differences between the molecular weights of gases in said mixture in a gas centrifuge having an inner, perforate, rotatable cylinder and an outer, continuous, smooth-walled, rotatable cylinder concentric with said inner cylinder defining an annulus therebetween, the radius of the inner cylinder being in the range of from about 0.70 to about 0.95 of the radius of the outer cylinder; said method comprising the steps of feeding a mixture of gases into said annulus in the centrifuge; rotating said inner and outer rotatable concentric cylinders at peripheral velocities to separate the mixture of gases into a lighter fraction and a heavier fraction; establishing a multiple array of cellularly-shaped stationary vortices in the gases in the annulus, whereby the residence time of the gases in the annulus is increased; removing the lighter fraction from the inner area of the annulus; and, removing the heavier fraction from the peripheral area of the annulus.

2. A method as claimed in claim 1 wherein the inner cylinder is rotated with an angular velocity in the range of about 1.0 to 3.3 times the angular velocity of the outer cylinder.

3. A method as claimed in claim 2 wherein the inner and outer cylinders are rotated at different angular velocities sufficient to attain peripheral velocities in the range of from about 80 to about 600 meters per second.

4. A method as claimed in claim 2 wherein the inner and outer cylinders are rotated at the same angular velocities in the same direction and wherein the inner and outer cylinders are rotated at an angular velocity sufficient to attain peripheral velocities in the range of from about 400 to about 600 meters per second.

5. A method as claimed in claim 3 wherein the inner and outer cylinders are rotated in the same direction.

6. A method as claimed in claim 5 wherein the inner cylinder is rotated at an angular velocity sufficient to attain a peripheral velocity in the range of from about 400 to about 600 meters per second and the outer cylinder is rotated at an angular velocity sufficient to attain a peripheral velocity in the range of from about 80 to about 570 meters per second.

7. A method as claimed in claim 3 wherein the inner and outer cylinders are rotated in opposite directions.

8. A method as claimed in claim 7 wherein the inner cylinder is rotated at an angular velocity sufficient to attain a peripheral velocity in the range of from about 400 to about 600 meters per second and the outer cylinder is rotated at an angular velocity sufficient to attain a peripheral velocity in the range of from about 80 to about 570 meters per second.

9. A process as claimed in claim 1 wherein the mixture of gases contains one or more of U235 and U238 in uranium hexafluoride.

10. A method as claimed in claim 1 wherein the mixture of gases is fed into said annulus through the inner, perforate cylinder.

11. A method as claimed in claim 1 wherein the mixture of gases is fed directly into the annulus at one end thereof, and said lighter and heavier fractions are removed from the annulus at an opposite end thereof.

12. A method as claimed in claim 1 wherein the mixture of gases is fed directly into the annulus at opposite ends thereof, and said lighter and heavier fractions are removed from the annulus at opposite ends thereof.

13. A gas centrifuge for separating and enriching mixtures of gases based on differences between the molecular weights of gases in said mixture comprising, in combination, an enclosure having a shaft mounted therein for introducing said gas mixture axially into said enclosure, a rotor assembly arranged coaxially around said shaft comprising an outer, imperforate, cylindrical wall and an inner, perforated cylindrical wall coaxial with said shaft, closure means at each end of said cylindrical walls for capping said cylinders whereby an annulus is defined between said cylinders, means for rotating said cylinders at peripheral velocities in the range of from about 80 to about 600 meters per second whereby a mixture of gases introduced axially into said centrifuge is separated into a lighter fraction and a heavier fraction, the radius of the inner cylinder being in the range from about 0.70 to about 0.95 of the radius of the outer cylinder, and means for discharging separated gases from the periphery of the annulus and from the inner portion of the annulus.

14. A gas centrifuge as claimed in claim 13, means for rotating the inner cylinder and means for rotating the outer cylinder independently of each other.

* * * * *